Figure 3:
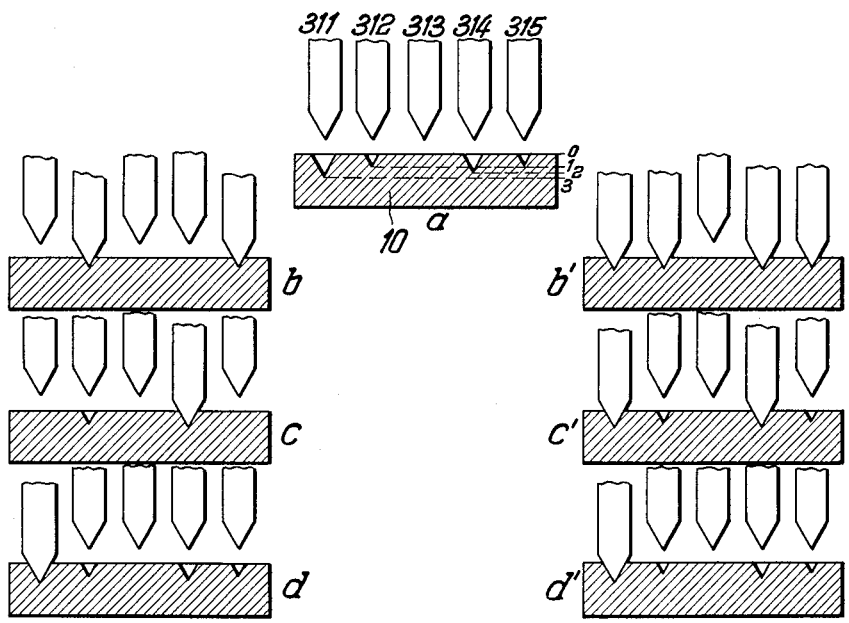

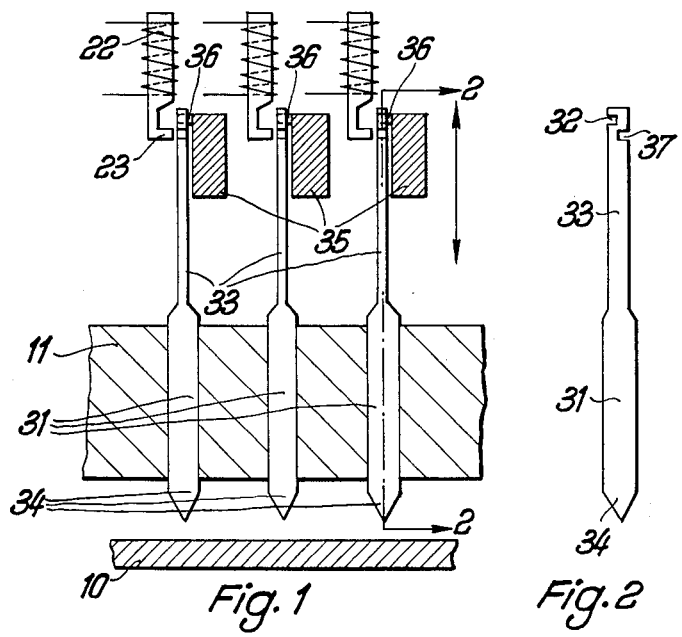
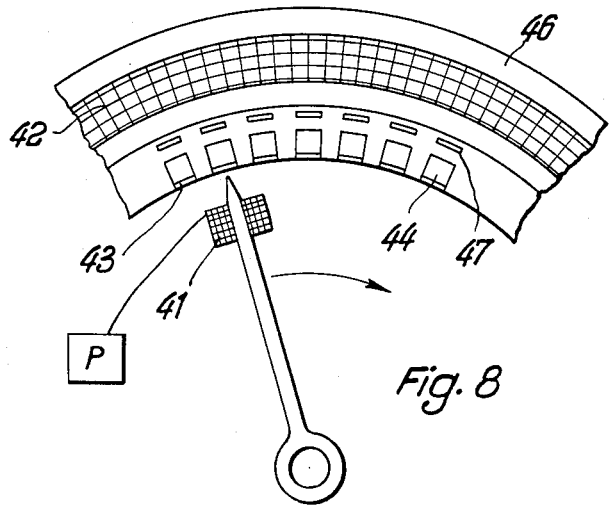

April 16, 1963   O. DIETZSCH, SR., ETAL   3,086,134
DEVICE FOR THE TWO-DIMENSIONAL ARRANGEMENT, VARIABLE
ACCORDING TO PATTERN, OF A PLURALITY OF ELONGATED
CONTROL MEANS FOR MULTI-MEMBER MACHINES
Filed Feb. 18, 1959    5 Sheets-Sheet 5
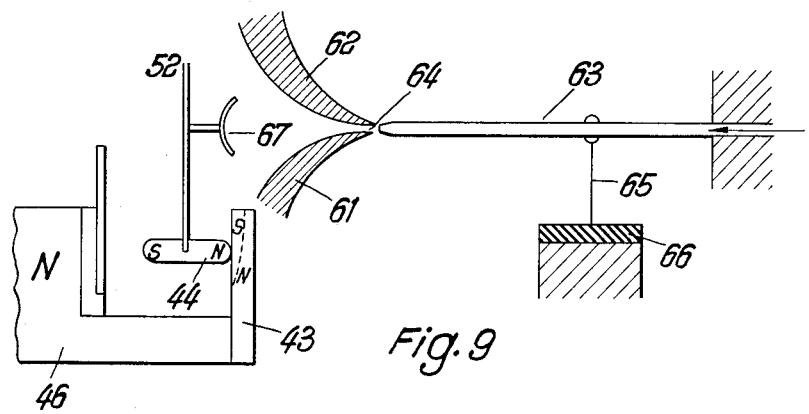
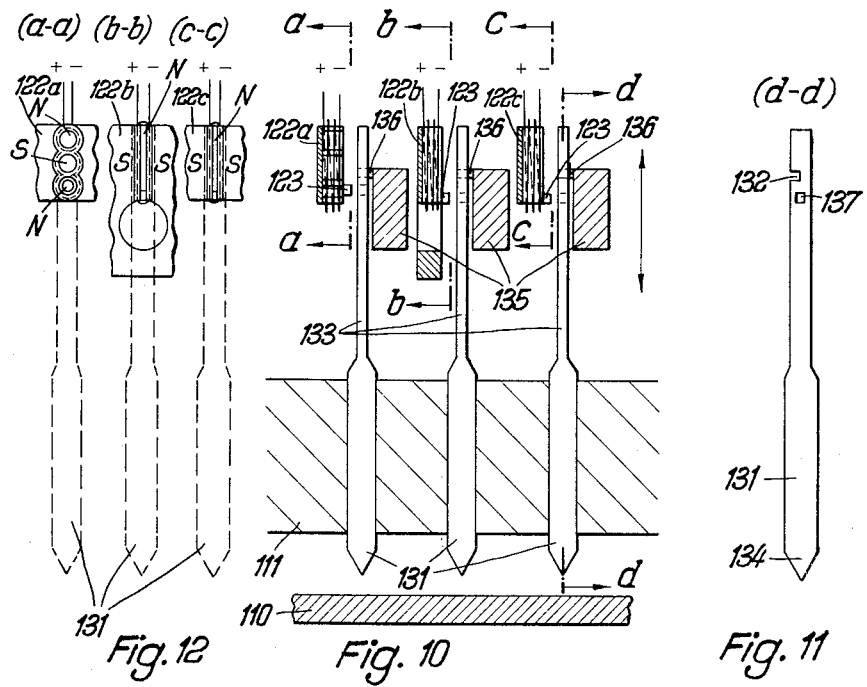

3,086,134
DEVICE FOR THE TWO-DIMENSIONAL ARRANGEMENT, VARIABLE ACCORDING TO PATTERN, OF A PLURALITY OF ELONGATED CONTROL MEANS FOR MULTI-MEMBER MACHINES
Otto Dietzsch, Sr., Wangen, Bodensee, Hans-Joachim Richard Otto Dietzsch, Wiesbaden, and Otto Harald Emil Dietzsch, Wangen, Bodensee, Germany; Clara H. Dietzsch, Hans-Joachim R. O. Dietzsch, and Otto H. E. Dietzsch, heirs of said Otto Dietzsch, Sr., deceased, Hans-Joachim R. O. Dietzsch and Otto H. E. Dietzsch, assignors to Verwaltungsgesellschaft der Werkzeugmaschinenfabrik Oerlikon
Filed Feb. 18, 1959, Ser. No. 794,081
4 Claims. (Cl. 310—78)

The invention relates to a device for the two-dimensional arrangement, variable according to pattern, of a plurality of elongated control means for multi-member machines.

Special field for using the device according to the invention is the engraving of printing plates or impression cylinders by producing screen-like arranged holes of different depth and, on occasion, of different width by means of graver-like (burin-like) tools which produce recesses; but the device can also be used advantageously wherever it is necessary to sort a plurality of pins and needles, preselected in an extremely short time according to pattern, simultaneously for different purposes into two positions, for inst., for actuating valves for opening a plurality of inking nozzles for direct printing or the like, for the punching of multi-hole cards or strips, for actuating knitting or weaving needles or braids, or generally for closing a certain number of circuits of a great quantity of electrical branchings connected parallel and/or in series.

Engraving devices, wherein screen holes of different depth are produced by means of a single graver or of a few individually controlled gravers, are not new. The screen depth desired is determined by adjusting the intensity of each single stroke. However, owing to the large number of motions of the graver to be executed successively, such devices operate very slowly, since each hole is produced individually by a stroke, the intensity of which is predetermined by corresponding, continuously adjustable measures.

According to the invention, this disadvantage of the known devices is overcome by the use of a large number $m$ of individual one- or two-dimensional gravers, which, by suitable means, are brought together, several times selected according to pattern and simultaneously, with the body to be engraved for the purpose of screen holes by a driving means, whereby the individual gravers carry out each joint stroke with the same intensity which can be varied from stroke to stroke.

The practice only requires a certain maximum depth or width of penetration of the graver into the printing plate. It is evident the device urging the graver against the printing plate can be simplified considerably if the separate strokes are not guided at a random intensity between zero and the maximum intensity desired, but only at a given number $n$ of different intensities. This number to be selected at will then determines the number of strokes required for the engraving of a specific pattern according to the invention. At $n=10$, there is no longer any practical difference as against the continuous method of working. Since the number $m$ of the gravers simultaneously guided with one stroke can be selected one power of ten $m=2n$ higher than the number $n$, the engraving of a screen consisting of a given number of points, when using the device according to the invention, requires a number of strokes smaller by $$\frac{m}{n \cdot a}$$

than are required in the known process with only $a$ gravers. As already mentioned, $a$ is a very small number, and the device according to the invention therefore results in a considerable saving of time.

The selecting of the gravers according to pattern for the separate strokes (blows) according to the conventional process used, for inst., in the printing trade, also means a considerable loss of time. For this reason, the invention provides that the individual pesteles are selected by electric means described in detail below and are exposed to the mechanical driving means for the purpose of bringing them together with the plate to be engraved.

Accordingly, the invention consists of a device for the two-dimensional arrangement, variable according to pattern, of a plurality of elongated control means for man-member machines and is characterized in that, first, a partial quantity, predetermined by pattern, of a large number of gravers arranged in a starting position is disconnected from a mechanical driving means for the gravers by electromagnetic drawing or holding impulses correlated with the individual gravers, and that the remaining non-disconnected quantity is displaced perpendicularly to the surface to be engraved by the driving means, whereby the drawing or holding impulses are selected successively according to pattern by preselection of separate contacts correlated with the separate gravers by means of electronically controlled (selection) impulses and are subsequently released simultaneously, in that the actual engraving is done subsequently either with the gravers of the residual or partial quantity having remained in the starting position by simultaneously bringing together these gravers with the surface to be engraved at a predetermined engraving intensity which is the same for all gravers, and in that all gravers are finally reunited in their starting position by the driving means.

Figure 4B:
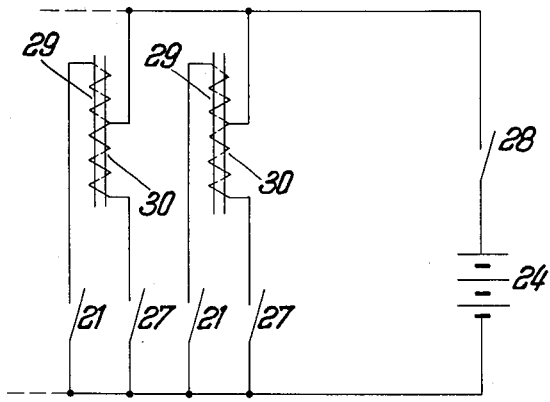
Figure 4A:
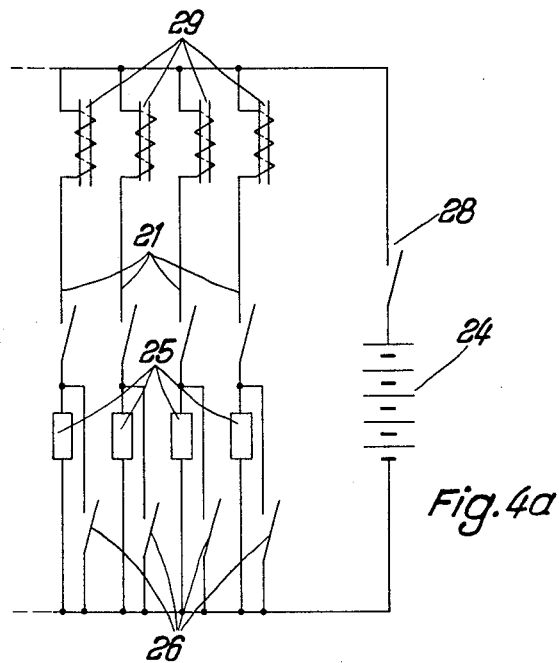

The device according to the invention will now be described in detail by way of the following description and the accompanying drawing, in which:

FIG. 1 is a diagrammatic partial top view of the engraving device according to the invention, FIG. 2 is a section through a graver taken on the line 2—2 in FIG. 1, FIG. 3 shows an engraving diagram illustrating the operating principle of the device according to the invention, FIG. 4a shows a wiring diagram illustrating the electrical connection of the electromagnets to a source of current, FIG. 4b shows a wiring diagram illustrating the electrical connection of the electromagnets, provided with auxiliary windings in modification of those shown in FIG. 4a, to a source of current.

Figure 7:
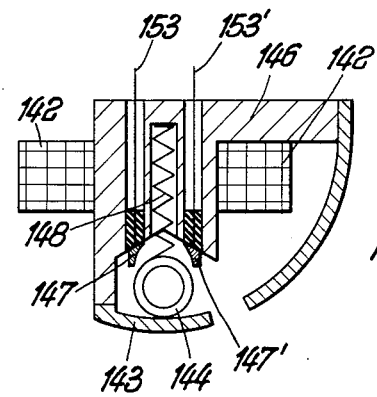
Figure 5:
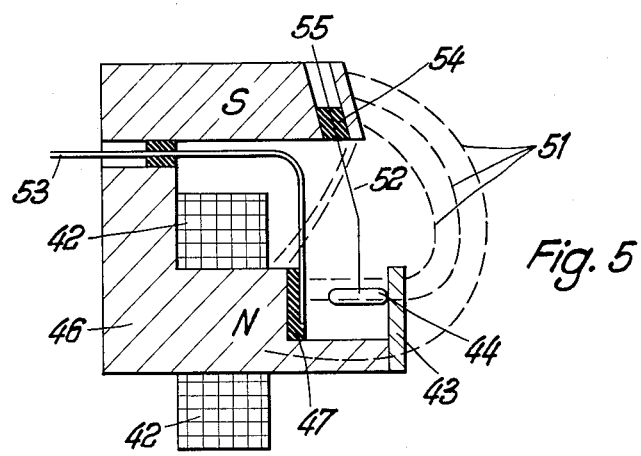
Figure 6:
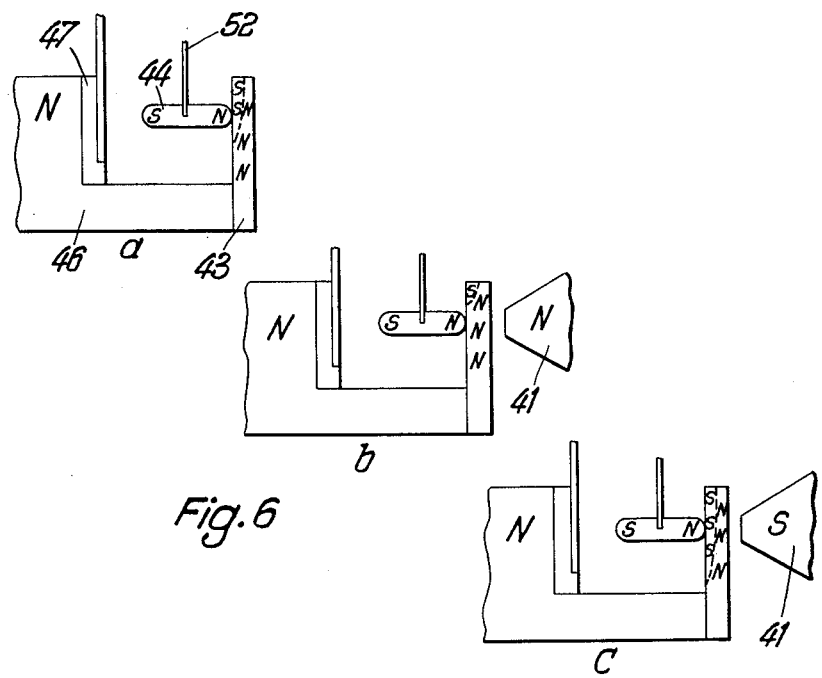

FIG. 5 is a cross section through a magnetic switch according to the invention,

FIG. 6 is a cross section according to FIG. 5 diagrammatically illustrating the distribution of the magnetic charge in the switch in dependence on the polarization of the impulse transmitter, FIG. 7 is a cross section through another embodiment of the switch shown in FIG. 5, FIG. 8 is a top view of a section of the series of juxtaposed switches with impulse transmitter indicated, FIG. 9 is a cross section according to FIG. 6, wherein the switch is influenced by a stream of gas, FIG. 10 is a diagrammatic partial top view of a modified embodiment of the engraving device, similar to FIG. 1, FIG. 11 is a section through a graver taken on the line d—d in FIG. 10, and FIG. 12 are top views of the device according to FIG. 10 taken on the lines a—a, b—b and c—c.

The basic structure of the engraving device according to the invention is apparent from FIGS. 1 and 2. Each graver 31 movably arranged in a guide 11 comprises a ferromagnetic, elastic end 33 provided with two grooves 32 and 37, and a pointed end 34. If the elastic end 33 is in the position shown in FIG. 1, a lug 36 of a driving means 35 (operated, for example, and including the means disclosed in my Pat. 2,845,093) reciprocating in the direction of the double arrow engages the groove 32, so that the pointed end 34 of the graver can be brought against the printing plate 10 to be engraved by the motion of the driving means. The depth or width to which the pointed or similarly shaped end 34 can penetrate into the plate can be adjusted by controlling the motion of the driving means 35.

The elastic end 33 can be withdrawn from the driving means 35 by actuating the stationary electromagnet 22 in the manner described below. This will disengage the groove 32 from the lug 36, and the lug 23 of the armature of the electromagnet 22 engages with the groove 37 of the graver end 33, so that the graver 31 is now immovably connected to the stationary electromagnet 22. The re-engagement with the lug 36 is effected by switching off the current flowing through the electromagnet 22 after the driving means 35 has returned into its starting position.

The principle, according to which a predetermined pattern is engraved into the plate 10, is readily understood from the diagram of FIG. 3, in which $m=5$ and $n=3$. For example, if several holes having the relative depths 3, 1, 0, 2, 1 are to be punched in the plate 10 by means of the five gravers 311–315, as this is shown in FIG. 3a, three strokes are required according to the invention. First, the gravers 311, 313 and 314 are disengaged from the driving means 35 by actuating the magnet 22, and the remaining gravers 312 and 315 are urged (guided) against the plate 10 with the intensity 1 by the driving means whereby they are caused to punch holes of depth (or width) 1 into the plate 10 at the places provided therefor according to FIG. 3b. After these two gravers have been withdrawn by the driving means, the gravers 311, 312, 313 and 315 are disengaged from the driving means, and the graver 314, subjected to a somewhat stronger motion of the driving means, punches a hole of depth 2 into the plate according to FIG. 3c. After graver 314 has been returned to its starting position, the hole on the far left having depth 3 is produced by the third stroke carried out by the graver 311 alone. The same result can also be produced by the order of strokes illustrated in FIGS. 3b' to 3d' which is readily understandable from the above description. Compared with the first process, the second one has the advantage that the greater depths are "prehammered."

A special feature of the invention consists in that the electromagnets 22 to be actuated according to the pattern desired are consecutively preselected by electric devices and, after being selected, are caused to respond simultaneously. The wiring principle used for this purpose is shown diagrammatically in FIGS. 4a and 4b. The individual electromagnets 22 are preselected in a manner described in detail below, according to the pattern proposed, by closing or opening the self-supporting electromagnetic switches 21 arranged in series and actuated by an impulse transmitter 41 (FIG. 8), the structure of which will be explained below and which is supplied pulses by a magnetic tape circuit or conventional arrangement P such as disclosed in Pat. No. 2,800,073. In addition, FIG. 4a shows that a current-limiting resistance 25, which can be selectively bridged by a switch 26, is arranged in series with each winding 29 of the electromagnet 22 and switch 21. These separate portions of the circuit formed by the elements 21, 22, 26 and 29 are connected, parallel to one another, to a source of current, preferably to a direct-current source, by way of a main switch 28, whereby the separate electromagnets 22 preselected by setting the switch 21 may be caused to respond simultaneously by actuating the switch 28.

The resistances 25 which can be bridged by the switch 26 regulate the current flow through the individual electromagnet coils 29, since the force of the magnet 22 at the moment the magnetic field is established attracting the elastic end 33 of the graver 31 must be greater, because of the relatively large air gap between the lug 23 and the end 33, then during the subsequent time until the main switch 28 is closed, during which time the size of the air gap has dropped to a fraction of its previous value. The advantage of this manner of regulating the current flow resides, on the one hand, in a reduction of the consumption of current of coil 29 and, on the other, in a distribution of the strong drawing impulses as to space and time over the totality of the magnets, whereby reciprocal interference fields within the entire electromagnetic block are avoided. All the switches 26 are temporarily closed, for inst., by a constant magnetic field running synchronously with the impulse transmitter 41, regardless of whether or not the correlated switch 21 is to be caused to respond by the impulse transmitter 41, whereby the magnetic field is so adjusted to the impulse transmitter that it closes each switch 26 shortly before, simultaneously with, or shortly after the possible closing of the corresponding switch 21 and opens same again shortly after the possible closing of the corresponding switch 21.

The same effect may also be produced, according to FIG. 4b, by providing a second winding 30 on the electromagnet 22; regardless of whether current is to be caused to flow through the main coil 29 by closing the corresponding switch 21, the second winding 30 is connected, every time from shortly before the possible closing of switch 21 to shortly after the possible closing of switch 21, to the source of current 24 by way of the switch 27 actuated by means of a constant magnetic field running synchronously with the impulse transmitter 41. Of course, the current flow through the auxiliary coil 30 is so dimensioned that the elastic end 33 of the respective graver 31 is not disengaged from the lug 36 of the driving means 35 by the magnetic field thus created.

Another possibility of reducing the current intensity required for attracting the ends 33 of the graver 31 by means of the electromagnet 22 consists in bringing, prior to selecting the switches 21 according to a pattern, all elastic ends 33 mechanically or magnetically (for inst., by the simultaneous operation of all auxiliary coils 30) to the respective magnets 22, retaining those switches selected according to the pattern by the relatively weak magnetic fields of the coils 29, and subsequently returning those switches not selected according to pattern into their detent position on the driving means 35. In this case, the auxiliary devices 25, 26 and 27, 30 shown in FIGS. 4a and 4b, respectively, are not required.

Finally, there exists the possibility of locking the gravers 21, after they have been returned into the starting position shown in FIG. 1 but prior to their subsequent disengagement, by a suitable means not shown, and of disconnecting the connection between the elastic end 33 and the lug 36 of the driving means 35 by a little retrograde motion of the driving means, so that the magnetic drawing impulse does not need to overcome any additional friction. A similar locking may also be effected after the separation into the two partial quantities for the engraving process has taken place.

The structure and the mode of acting of the switches 21 can be seen from FIGS. 5 and 6. For example, all switches are juxtaposed circularly in a horseshoe-shaped magnetic body 46 excited by a magnet coil 42 (FIG. 8), each comprising two contact members 44 and 47. Contact 47 fixedly arranged on the magnetic body 46 and not necessarily electrically insulated against same can be connected by way of the line 53, while contact armature 44 movably fastened to the magnetic body 46 by means of a spring 52 and insulated at 54 can be connected by way of the line 55 and the conductive spring 52. A small ferromagnetic plate (lamella) 43 is also disposed on the magnetic body 46 and is polarized by the main magnetic field to become a small auxiliary magnet. The polarization conditions of the lamella 43 can be influenced by an impulse transmitter 41 passing at close proximity. If the impulse transmitter is at first disregarded and if the electric current flows through the magnet coil 42 in such a manner that a south pole S develops on the top leg of the horseshoe and a north pole N on the bottom leg of the horseshoe, see FIG. 5, the magnetic flux in the body 46 is closed by the lines of flux shown as 51. Owing to the action of the outer field 51, the magnetic charges both of the ferromagnetic armature 44 and of the ferromagnetic lamella 43 are separated in the manner shown in FIG. 6a, whereby the armature 44 kept under the influence of the spring 52 in proximity of the lamella 43 "metastably" joins the lamella, since the magnetic attractive forces caused by the very narrow gap between the charges of the armature and the lamella exceed the attraction of the main magnetic field on the armature which acts from a greater distance. However, if the polarization distribution in the lamella 43 is disturbed by an impulse transmitter 41 acting, for inst., as north pole according to FIG. 6b, the two closely adjacent poles 44 and 43 repel one another, and the armature 44 touches the contact 47. The impulse transmitter 41 has only a releasing effect by slightly enlarging the gap between armature 44 and lamella 43. This causes the attraction of the main magnet to become increasingly powerful very quickly and to shift (turn about) the armature, even if the outer interference field is no longer present owing to the continued running of the impulse transmitter. At the proper time the armature can then again be returned to its metastable position by a brief interruption of the current flow by the coil 42. In case it is not desired to turn down the armature 44 into its stable end position in which it touches the contact 47, the metastable character of the starting position of the armature as shown in FIG. 6a can be strengthened by emitting an opposite magnetic impulse by the impulse transmitter 41 (FIG. 6c).

FIG. 7 shows another embodiment of the switch 21 according to the invention based on the same principle. By way of example, all switches are again arranged in juxtaposition in a magnet body 146 excited by a magnet coil 142, but having in this instance the shape of a gripper, and comprise two contact members 147 and 147' which can be connected by way of the lines 153 and 153' and one of which or both of which are insulated against the magnet body 146. In case of appropriate polarization of the ferromagnetic lamella 143, the contact members 147 and 147' can be short-circuited by means of the impulse transmitter, running past and not shown in the drawing, by the tubularly constructed armature 144. The armature 144 is returned into its metastable position shown in FIG. 7 when the main magnetic field is switched off by the spiral spring 148.

The lamellae 43, 143 and the armature 44, 144 of the two embodiments have preferably a small ferromagnetic mass, so that the interference field 41 is able to operate with low energy.

The individual switches 21 are arranged linearly to one another, preferably circularly in juxtaposition. The circular arrangement has the advantage that the impulse transmitter 41, having influenced all switches, need not be returned into its starting position, but is able continuously to actuate the individual switches again and again.

FIG. 8 is a diagrammatic top view on a section of the row of the juxtaposed switches 21, consisting of the magnet coil 42, the magnet body 46, the separate contacts 47, the separate armatures 44, the separate ferromagnetic lamella 43 and the impulse transmitter 41. It is advisable that the entire switch arrangement together with the impulse transmitter be arranged in a closed chamber, preferably filled with inert (rare) gas.

The impulse transmitter may, for inst., consist of a rotating magnet coil with a high-frequency iron-core of usual construction, which is fed by impulses from a linear control (command) carrier, for inst. a magnetic tape.

The purely magnetic influencing of the switch armature 44 by the impulse transmitter may, according to FIG. 9, be replaced by a combined mechanical-magnetic influencing, in that the enlargement of the gap between armature 44 and lamella 43, which initiates the turning down (back) of the armature 44, is caused by directing a suitable stream of gas originating from a source not shown in the drawing at the armature spring 52. The stream of gas is guided by a small elastic steel tube 63 which is normally directed at a slit 64 in the screens 61, 62 and which can be removed from this normal position by a quartz crystal or a nickel rod 66 by way of a lever 65, so that the stream of gas passing through the small tube does not strike against the receiver 67 on the armature spring 52, but is turned aside by the screen 61 or 62. In this case the switches are obviously not arranged in a closed chamber.

FIGS. 10 to 12 show a modification of the group of structural elements. This modified embodiment has substantially the same structural and operating elements as those described above, and the same operative members, therefore, have the same reference characters as those in FIGS. 1 and 2 preceded by the hundred-index 1 . . . . This embodiment differs from the one described earlier merely in that the electromagnets 122 arranged in series are constructed as screened-type (shielded) electromagnets having an iron core common to all armatures of the series. Model 122a is provided with a winding triplet which produces the pole distribution shown on the left in FIG. 12. In embodiments 122b and 122c the winding is located in a double slit, so that one north pole is enclosed by two south poles. The two embodiments 122b and 122c differ as to the construction of the iron core.

This embodiment is characterized by a minimum of leakage (scattering) of lines of magnetic force, so that a possible addition of the extraneous field caused by an arbitrary arrangement of the pattern remains ineffective. Owing to the common ferromagnetic back of each series (or row) of magnets, the possibly occurring addition of the extraneous fields is screened off from one series to the next.

The invention is not limited to the embodiments described above. For example, instead of using the gravers 31, other tools, such as electrodes for spark erosion or supersonic engraving pins may be used for producing the screen holes. Moreover, instead of using the spring 52 or 148, a mechanical, pneumatic or magnetic device may be used for returning the armature 44 of the switch 21 into its metastable position during the switching interval (time delay) of the main magnet coil 42.

It is also possible to change the measurements of the magnet body 46, the contact armature 44 and the magnet lamella 43 in order to exchange the polarity of the impulse transmitter 41 required for turning back or not turning back the contact armature 44 in contrast with the embodiment shown in FIG. 6.

We claim:

1. A selection device comprising a plurality of displaceable members, displacing means for reciprocatingly driving selected one of said displaceable members, a plurality of holding magnets adapted to be selectively activated, each of said holding magnets operatively associated with one of said displaceable members for controlling the connection of said displaceable members with said displacing means during a switching process, a plurality of switches respectively electrically connected with said holding magnets, an impulse transmitter for selectively influencing the switching position of said switches, transportation means for successively passing said impulse transmitter past each of the switches, a source of electric current, and electrical connection means for connecting said source of electric current to said holding magnets and to said switches, and a main switch for simultaneously activating all magnets having their switches closed under the influence of the impulse transmitter and for simultaneously interrupting the driving connection of selected displaceable members so that said displacing means reciprocatingly drives the remainder of said displaceable members.

2. A selection device comprising a plurality of members, a plurality of holding magnets each operatively associated with one of said members, a plurality of switches with a metastable starting position respectively associated with said plurality of holding magnets, an impulse transmitter for generating magnetic fields for actuating the switches for causing the energization of said holding magnets to lock selected of said members against movement, mechanical driving means reciprocatingly driving the unlocked members, a controllably energizable magnet coil to generate a main magnetic field common to all said switches, ferromagnetic lamellae included in each of said switches and polarized in reciprocal action with the main magnetic field to constitute small auxiliary magnets whereby the metastable starting position of said switches is developed, and ferromagnetic contact members for each of said switches which are constantly polarized under the influence of the main magnetic field and abut, in the metastable position of the switch, the respective ferromagnetic lamellae and which, in the end position, establish a current connection between two electric connections included by each switch, whereby said lamellae and the contact members have opposite polarities at their zone of contact, but whereby said polarities can be controlled by an external magnetic interference field emitted by said impulse transmitter.

3. A method of repeatedly selecting members from a plurality of members and for reciprocatingly driving the unselected members comprising the steps of successively pre-selecting pulling pulses for holding magnets by closing self-locking switches connected in series with a plurality of said members by means of selecting pulses, simultaneously unlocking selected members from a mechanical drive means by closing a main switch connected in series with a source of electric current and a switch with a parallel array of holding magnets and switches so that the pulling pulses of the holding magnets act upon said members, reciprocating the unselected members by driving means, releasing said unlocked members, and locking said selected members to said drive means preparatory to the next selection step.

4. The method according to claim 3 including the step of sweeping a magnetic field past the switches for generating said selecting pulses.

References Cited in the file of this patent

UNITED STATES PATENTS

| | | |
|---|---|---|
| 766,369 | Horvath | Aug. 2, 1904 |
| 1,856,175 | Towle | May 3, 1932 |
| 1,914,258 | Howey | June 13, 1933 |
| 2,076,220 | Bennett | Apr. 6, 1937 |
| 2,744,578 | Mallina | May 8, 1956 |
| 2,831,355 | Zimmerman | Apr. 22, 1958 |